United States Patent [19]

Japenga et al.

[11] Patent Number: 4,641,269

[45] Date of Patent: Feb. 3, 1987

[54] PROGRAMMABLE CONTROL SYSTEM FOR GLASSWARE FORMING MACHINES

[75] Inventors: Robert J. Japenga, Simsbury; Paul F. Scott, Granby, both of Conn.

[73] Assignee: Emhart Industries, Inc., Farmington, Conn.

[21] Appl. No.: 883,460

[22] Filed: Jul. 9, 1986

Related U.S. Application Data

[63] Continuation of Ser. No. 765,566, Aug. 13, 1985, abandoned, which is a continuation of Ser. No. 461,086, Jan. 26, 1983, abandoned.

[51] Int. Cl.[4] .......................... G06F 15/46; C03B 9/40
[52] U.S. Cl. ..................................... 364/473; 364/476;
364/900; 364/146; 364/138; 364/131; 65/160;
65/163
[58] Field of Search ............... 364/200, 900, 131, 133,
364/136, 138, 139, 143, 144, 146, 473, 476;
65/158, 160–164; 178/22.08

[56] References Cited

U.S. PATENT DOCUMENTS

| Re. 29,642 | 5/1978 | Kwiatkowski et al. | 364/143 |
|---|---|---|---|
| 4,108,623 | 8/1978 | Cárdenas-Franco | 364/473 |
| 4,149,242 | 4/1979 | Periz | 364/200 |
| 4,152,134 | 5/1979 | Dowling et al. | 65/158 |
| 4,161,027 | 7/1979 | Russell | 364/138 |
| 4,247,317 | 1/1981 | Wood et al. | 65/158 |
| 4,251,858 | 2/1981 | Cambigue et al. | 364/200 |
| 4,253,148 | 2/1981 | Johnson et al. | 364/200 |
| 4,288,849 | 9/1981 | Yoshida et al. | 364/474 |
| 4,338,116 | 7/1982 | Huff et al. | 65/158 |
| 4,347,563 | 8/1982 | Paredes et al. | 364/133 |
| 4,351,025 | 9/1982 | Hall, Jr. | 364/133 |
| 4,368,514 | 1/1983 | Persaud et al. | 364/200 |
| 4,369,052 | 1/1983 | Hotmer | 65/158 |
| 4,399,502 | 8/1983 | MacDonald et al. | 364/138 |
| 4,408,281 | 10/1983 | Tack, Jr. et al. | 364/143 |
| 4,413,314 | 11/1983 | Slater et al. | 364/138 |
| 4,424,559 | 1/1984 | Lorincz et al. | 364/131 |
| 4,463,416 | 7/1984 | Wood | 364/143 |
| 4,478,629 | 11/1984 | Wood et al. | 364/473 |

FOREIGN PATENT DOCUMENTS 0069375  1/1983  European Pat. Off. ............. 65/160

OTHER PUBLICATIONS

"The ND6600 Computer in Fusion Energy Research," Young, K. G., ORNL/TM-8107, pp. 6–8, 12/82.
"A Key Notarization System for Computer Networks," Smid, M. E., NBS Special Publication 500-54, 10/79.

*Primary Examiner*—Jerry Smith
*Assistant Examiner*—John R. Lastova
*Attorney, Agent, or Firm*—Arthur B. Moore

[57] ABSTRACT

A control system for the control of a multisection glassware forming machine in a manner which enables totally independent operation of any section regardless of the status of remaining sections. The control program for each section is stored in unalterable, read-only memory within a local computer associated respectively with each section. Each local computer is provided with at least two communication ports. A local terminal may be selectively connected to any local computer via one of the communication ports to enter and display timing setting data. A machine terminal or machine supervisory computer may be selectively connected to any local computer through the other one of the ports. A bidirectional communications interface enables data transfer between the selected local computers and selected data input/output devices.

17 Claims, 7 Drawing Figures

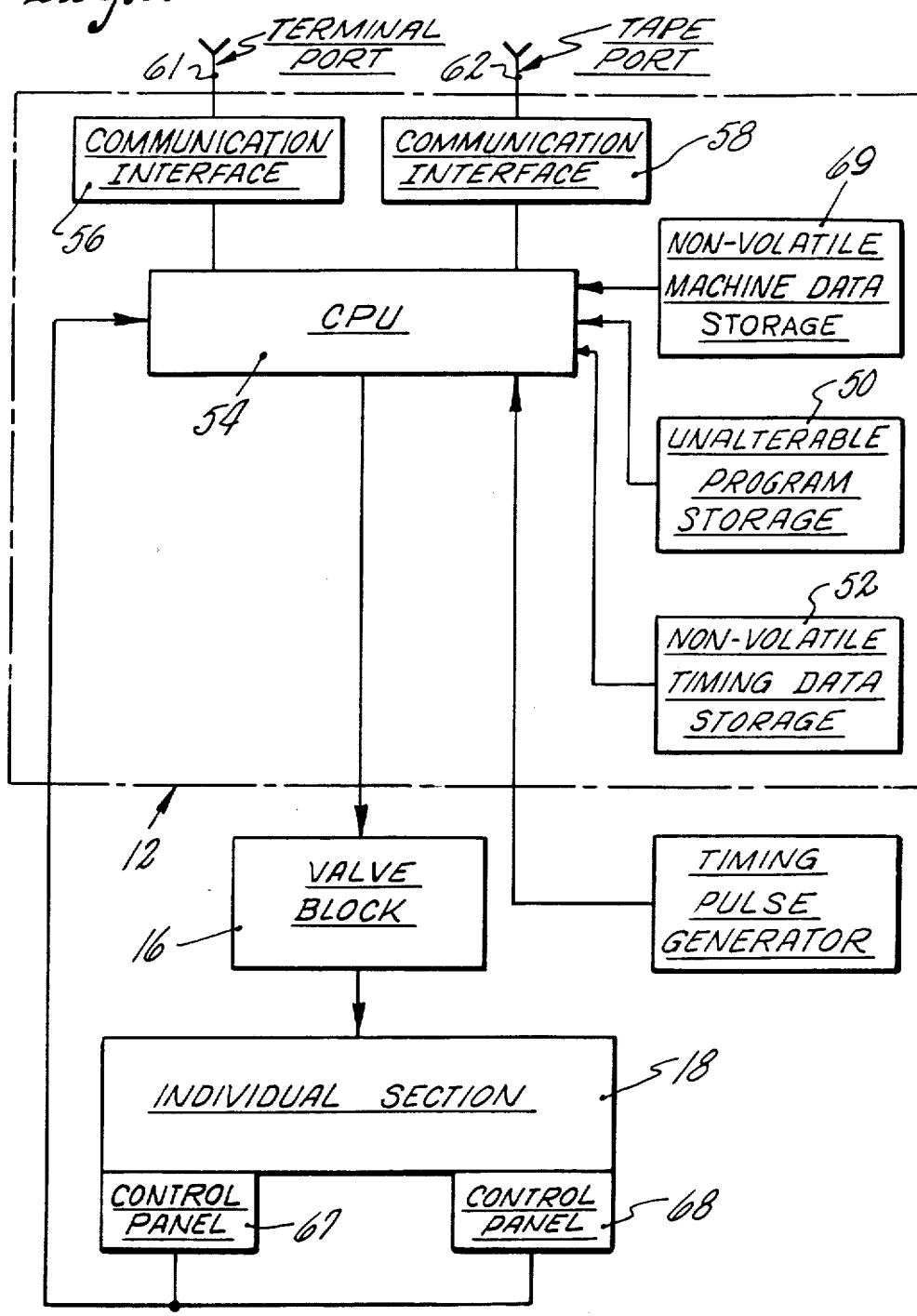

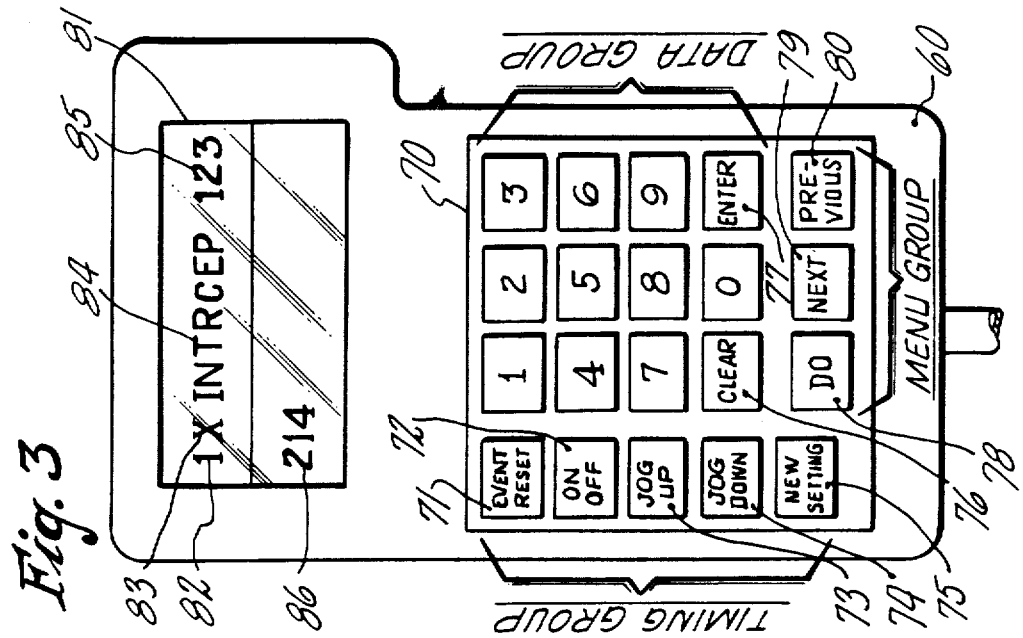

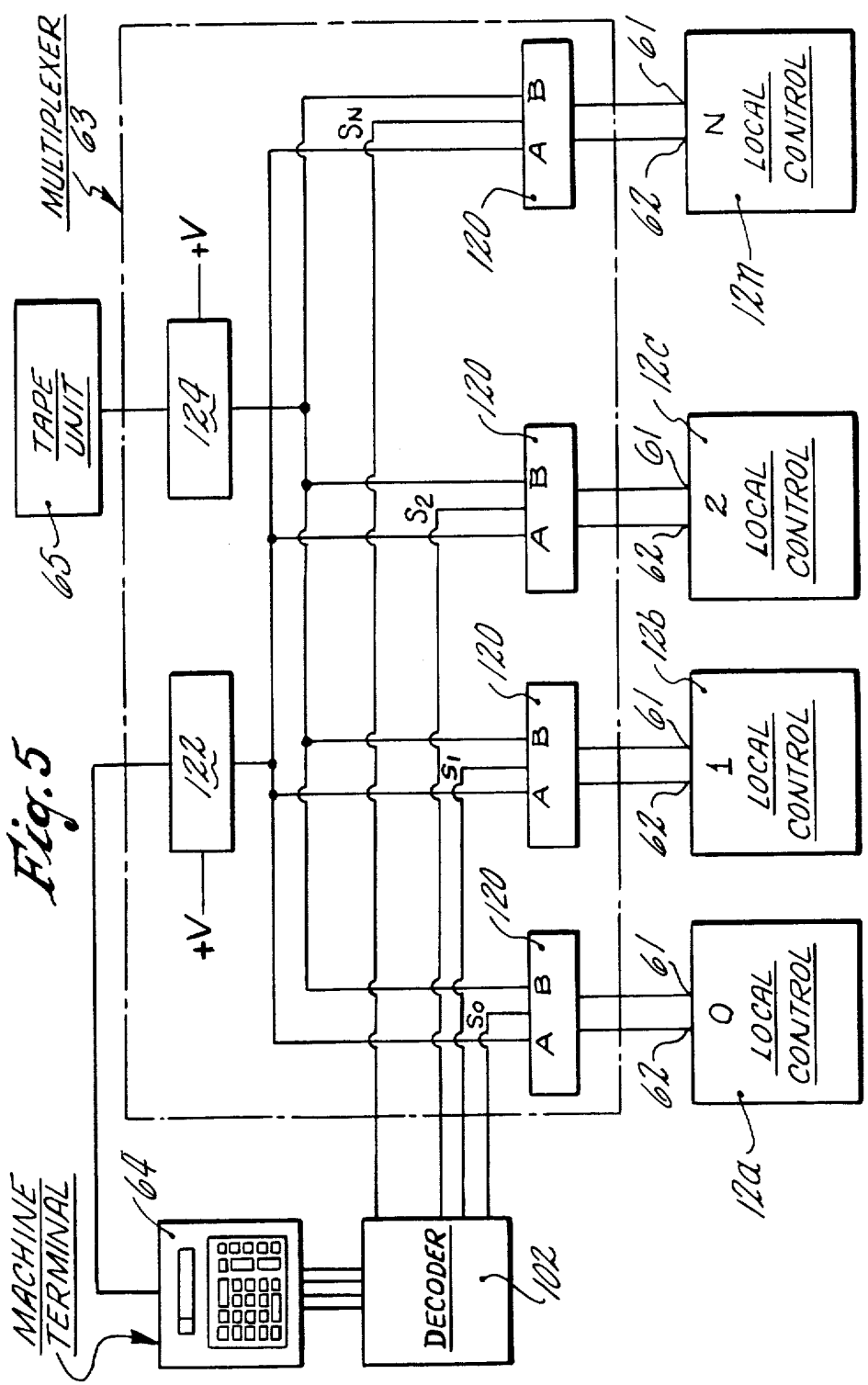

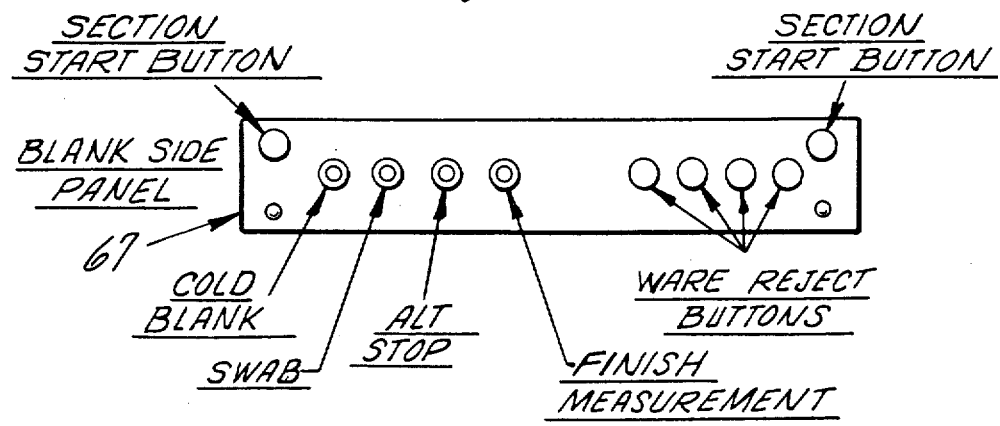
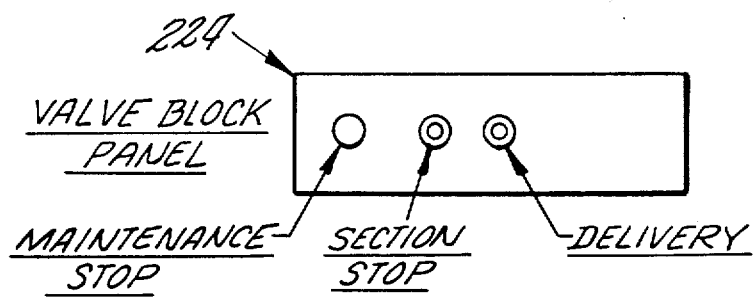
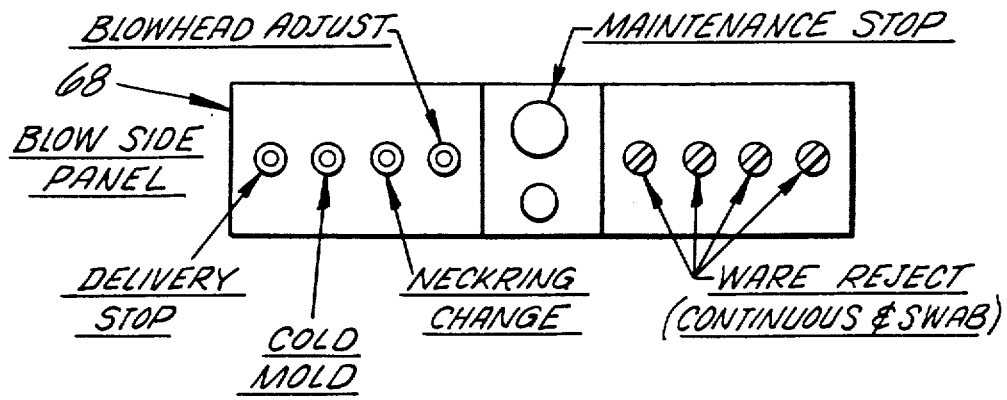
Fig. 7

PROGRAMMABLE CONTROL SYSTEM FOR GLASSWARE FORMING MACHINES

This is a continuation of co-pending application Ser. No. 06/765,566 filed on Aug. 13, 1985, which is a continuation of Ser. No. 461,086 filed 1/26/83 both now abandonded.

BACKGROUND OF THE INVENTION

1. Field of the Invention

The invention relates generally to controllers for controlling the cyclical operation of a plurality of machine components. More specifically, the invention relates to computer based timing and control of the plurality of components in each section of a multi-section glassware forming machine.

2. Description of the Prior Art

Electronic timing or control systems are well known for the control of a plurality of components of a machine. In some machines the components are arranged in a plurality of identical sections, each operating independently of the others in predetermined phase relationship relative to the machine cycle. Prior art electronic control systems have controlled the operation of such sections as a unit and have consequently required use of a single central processing unit (CPU) or supervisory controller connected in hierarchical fashion to a plurality of section controllers. A disadvantage of such systems is that a malfunction of the central controller of the hierarchy prevents operation of any subordinate section controllers.

An example of a multi-section machine of this type is the well-known individual section (IS) glassware forming machine. Electronic timing systems for glassware forming machines have been used for many years in place of mechanical, rotating timing drums. The old timing drums control the actuation of the various components within each section of the machine by actuating associated pneumatic valves with cams placed in circumferential grooves on the drum surface. Electronic timing systems replaced the rotating drum and cams with a solenoid actuated valve block (such as that disclosed in U.S. Pat. No. 3,918,489 assigned to the assignee of the present invention) and control means for actuating selected valves at predetermined times in a predetermined sequence relative to a machine cycle reference point. One major advantage of electronic timing systems is the ease with which the timing settings of the various components may be adjusted during machine operation.

Some prior art IS machine electronic timing systems use timing pulse generators and counters to count pulses occurring during the machine cycle and compare the current count to preset counts to determine when each component or machine event should be actuated (for example, U.S. Pat. No. 3,762,907). Other prior art electronic timing systems use similar count comparisons, but store the preset component timing settings (or machine events) in a core memory (for example, U.S. Pat. No. 3,974,432). Each device disclosed in these two prior art patents serves to control actuation of all section components within the machine but does not provide for independent control of each section.

Programmable automatic machine controllers are also known in the prior art as shown in U.S. Pat. No. Re. 29,642. This controller, however, utilizes a central machine console to couple data to and from each individual section memory unit, thus also preventing totally independent section operation. A similar centrally oriented system, but one incorporating feedback sensors and means for varying the duration of all events in response thereto, is shown in U.S. Pat. No. 4,108,623.

Another type of programmable prior art controller is disclosed in U.S. Pat. No. 4,152,134. This device is limited because it requires a central, machine supervisory computer to load control program and timing data into individual section computers. A malfunction in the machine supervisory computer would affect efficient operation of the sections of the machine.

Yet another programmable controller is disclosed in U.S. Pat. No. 4,247,317 which shows one way to store event timing data in a random access memory and means to alter same. This device uses a central console to control the relative timing of each section which effectively ties all section computer-memory controllers together into one hierarchical machine control system incapable of truly independent section operation.

U.K. Patent Specification No. 1,594,532, assigned to the assignee of the present invention, discloses a prior art electronic control system which utilizes independent, asynchronous clock signals which are produced at a rate independent of the speed of the glassware forming machine. The system disclosed is also for the control of a machine rather than a section.

Other examples of electronic controllers using one computer to control all sections of a machine are disclosed in U.S. Pat. Nos. 3,877,915 and Re. 29,188, assigned to the assignee of the present invention.

U.K. Patent GB No. 2,022,870B discloses a control system with one memory controller controlling each section of a machine. Even if this memory controller is implemented by a microcomputer (as is disclosed in the patent) the microcomputer merely emulates the memory controller's function and the necessary result is a simplistic cycling of the memory controller through a predetermined sequence of steps. There is no means disclosed for enabling modification of this predetermined sequence of steps at the section level in response to operator control. While the operator may adjust timing, there is no disclosure of means by which the operator could change the actual sequence of steps at the section level. Furthermore, the U.K. patent discloses a device necessitating a hierarchical computer or some other external type of loading mechanism for loading a control program. This is a limitation of the independence of the machine sections because they are dependent on an external loading device. Furthermore, this U.K. patent does not disclose means for controlling auxiliary machine functions.

All of the above prior art patents generally disclose a control system architecture comprising a "machine" controller and a plurality of subordinate "section" controllers. Such prior art devices therefore have the disadvantage of either requiring external devices to load control program data or of causing a shut down or inefficient operation of the entire machine in the event the main supervisory computer goes down.

Accordingly, there is a need for an individual section, independent programmable controller capable of independent control of each section of a machine. Such an independent structure would enable simultaneous operation of some or all sections of a machine and permit repairs of selected section controllers without affecting the operation of other sections or necessitating shutting down the entire machine.

The operation of prior art IS machines generally necessitates the operation of several desirable auxiliary or machine functions which are common to all sections although not required for the operation of any one section. Auxiliary function controls include, for example, controls for drive systems (controlling feeders, shears, gob distributors, conveyors, ware transfer devices, etc.), alarms (to signal warnings or malfunctions), shear spray (to lubricate and cool gob shears), cullet water and equipment, stackers (for lehr loading), surface coating equipment, etc. The operation of these auxiliary functions is somewhat related to the operation of the sections of the machine although each section can operate independently of the auxiliary functions.

Aforementioned U.S. Pat. No. 4,152,134 discloses the auxiliary function of selective bottle rejection. However, the machine supervisory computer disclosed in that patent provides the necessary link between each individual section and the bottle reject device. A malfunction of the machine supervisory computer would sever this link for all sections, thus preventing operation of this or other auxiliary functions with any section. Additionally, similar disadvantages arise when peripheral data input/output devices (such as keyboards, tape storage units or alphanumeric displays) are interfaced with the several sections through a hierarchical control structure.

Accordingly, it is another object of this invention to provide a control system to enable individual section independent control while also enabling isolated data communication between selected independent section controllers and selected peripheral data input/output units including auxiliary function devices.

SUMMARY OF THE INVENTION

These and other objects of the invention are achieved by the preferred embodiment disclosed herein which comprises a computer controlled timing system for controlling the actuation of a plurality of components of each section of a machine in accordance with a predetermined control program and selected timing data, said machine including a plurality of said sections each independently operable in phased relationship within the cycle of operation of said machine, said system for enabling the simultaneous and independent operation of said plurality of sections, said system comprising:

- a plurality of local computer means, each respectively associated with one of said sections, each of said local computer means having non-volatile storage means containing said predetermined control program and for containing said selected timing data therein for controlling the operation of its respective section independently of any other one of said sections;
- a plurality of interface means each interposed respectively between one of said local computer means and its associated section for actuating the components of said section in accordance with said predetermined control program and said selected timing data;
- terminal means for the display of predetermined portions of said predetermined control program, for the display and entry of said selected timing data and for the display and entry of other timing data to replace chosen portions of said selected timing data;

bidirectional communications means for selectively connecting said terminal means to a selected one of said local computer means.

In one embodiment disclosed herein the control system further comprises:

(a) a plurality of local computer means, each respectively associated with one of said sections, each of said local computer means comprising:
- an unalterable program storage means for storing said predetermined control program;
- a non-volatile setting storage means for storing said selected timing data;
- first and second independent communication ports for enabling interactive data communication between said local computer means and means connected to either of said ports;

(b) a global terminal means operatively connected to a machine supervisory computer means;

(c) a machine supervisory computer means operatively connected to said first communication ports and said global terminal means for selectively connecting said global terminal means to a selected one of said first communication ports, said machine supervisory computer not inhibiting the independent operation of said plurality of sections;

(d) a plurality of interface means each interposed respectively between each of said local computer means and its associated section for actuating the components of said section in accordance with said predetermined control program and said selected timing data.

BRIEF DESCRIPTION OF THE DRAWINGS

FIG. 2 shows a more detailed schematic block diagram of a portion of FIG. 1;

FIG. 3 is a diagrammatic view of the local terminal shown in FIG. 1;

FIG. 4 is a diagrammatic view of the machine terminal shown in FIG. 1;

FIG. 5 is a more detailed schematic of the multiplexer shown in FIG. 1;

FIG. 7 is a diagrammatic representation of three operator control panels.

DESCRIPTION OF THE PREFERRED EMBODIMENT

Figure 1:
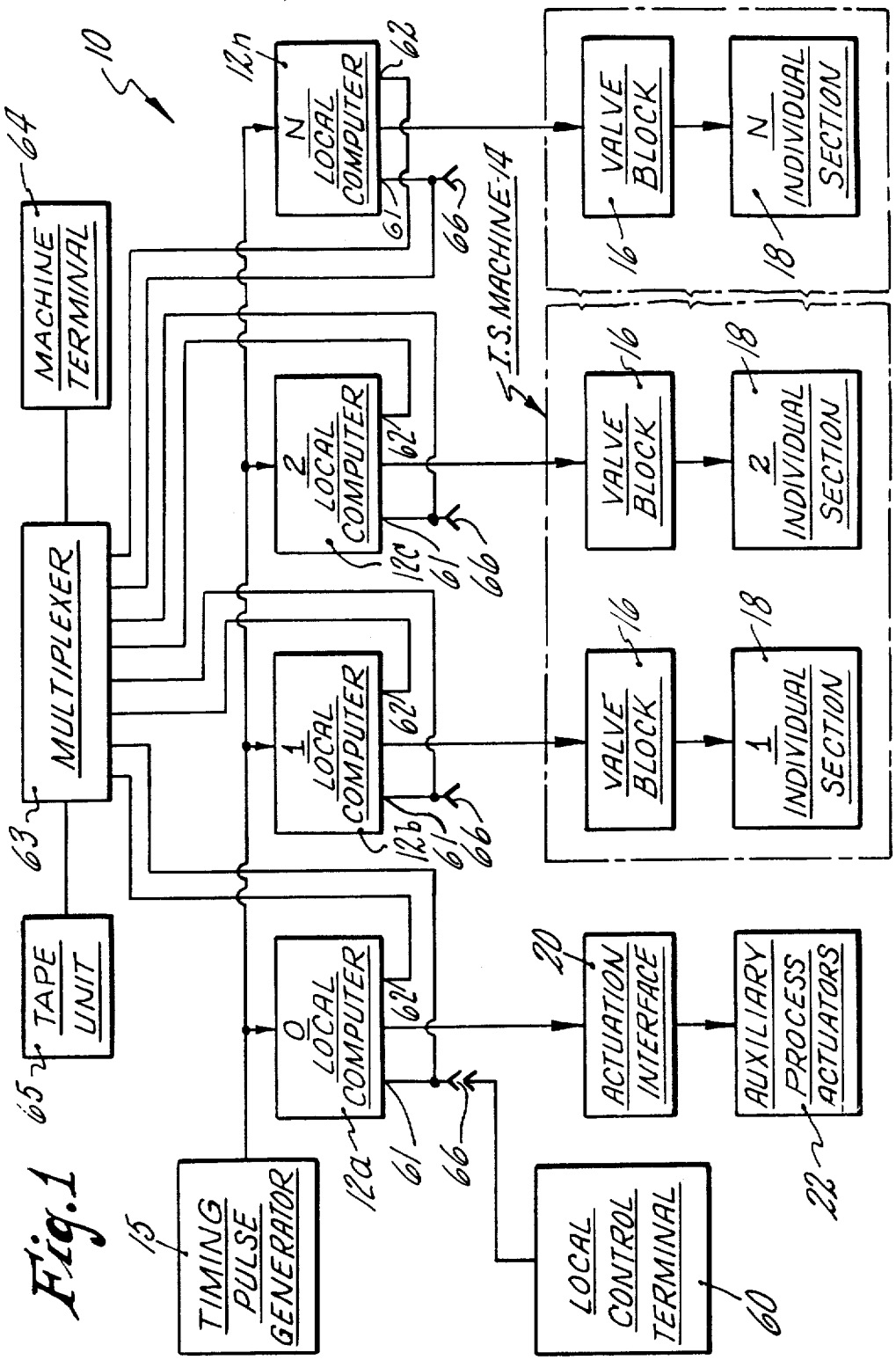
FIG. 1 shows a schematic block diagram of one embodiment of the invention installed for control of a multi-section glassware forming machine.

Referring now to FIG. 1 there is shown a control system 10 comprising a plurality of independent, individual stand alone section controllers (SASCON) or local computers 12b–12n each one of which includes identical hardware components although being capable of containing unique software. Each local computer 12 is assigned to a different section of an n-section multi-section machine, for example, a glassware I.S. forming machine 14. Timing pulse generator 15 provides synchronizing pulses to each local computer 12. The phased operation of each section is determined by the program within each local computer which basically offsets its respective starting point a predetermined amount from a synchronizing pulse. As shown in FIG. 1, a stand alone machine controller (SAMCON) or local computer "0" may be used to control auxiliary machine processes. In the case of a glassware forming machine these processes could be, for example, shear spray, cullet water and equipment, stacker, surface coating, alarms, drive systems for a feeder, shears, gob distributor conveyor, ware transfer devices etc. Local computer "0" identical to all other local computers 12 from a hardware point of view and is therefore designated by the numeral 12a.

The output of each local computer 12 is connected to a valve block 16 which serves as the actuation interface for actuating the various valves associated with the plurality of mechanical components in each corresponding individual section 18. The output of local computer 12a for controlling all auxiliary machines processes is connected by an actuation interface 20 to various auxiliary process actuators 22. As stated before, a single local computer 12a may be used to control a plurality of auxiliary process actuators 22. For example, one actuator could be associated with a ware transfer device, another could be associated with a gob distributor, etc.

Each local computer 12 is further provided with two data communications ports: terminal port 61 and tape port 62. Each port 61 and 62 of each local computer 12 is connected to multiplexer 63 which is in turn connected to machine terminal 64 and tape unit 65. Plug 66 on each local computer 12 is a port to which a local or hand-held terminal 60 may be selectively connected. As will be discussed below, selected control data or timing setting data from any chosen local computer may be entered or displayed either at machine terminal 64 or hand-held terminal 60. If desired, several operators could control several sections simultaneously by each operator using his own hand-held terminal 60.

As shown in FIG. 2, each local computer 12 includes a fixed, unalterable read only memory 50 and a non-volatile random access memory 52. In the preferred embodiment, ROM 50 comprises preprogrammed ROM chips (PROMs) for storing a predetermined control program to control the operation of each individual local computer 12 in accordance with timing settings or data which may be entered into RAM 52. Each local computer 12 may have different control programs stored in its ROM 50 depending on the function to be performed. For example, the control program stored in the local computer 12a associated with the auxiliary functions may be different from that stored in the local computers 12b–13n. The timing data in RAM 52 may be preprogrammed or may be entered by a machine operator through hand-held local terminal 60 or machine terminal 64. RAM 52 is non-volatile and may be connected to a battery back-up pack (not shown) to assure that the data in RAM 52 is not lost in the event of inadvertent power failure.

Each local computer 12 also includes a central processing unit 54 and data communications interfaces 56 and 58 interconnecting CPU 54 to local ports 61 and 62, respectively. While ports 61 and 62 are is shown in FIG. 1 as being connected to multiplexer 63 this is not necessary for the operation of the preferred embodiment. Since one advantage of the invention is its flexibility and interchangeability of components, all local computers 12 are identical from a hardware point of view and are, in practice, constructed with both ports 61 and 62. However, only port 61 and plug 66 need be used since data input and output can be accomplished through hand-held terminal 60. The machine terminal 64 is nevertheless used in the preferred embodiment to provide the operator with a convenient, centrally located access point for all sections. Each local computer 12 also includes a non-volatile random access memory 69 for storing machine data representative of the particular machine with which the respective section of the local computer 12 is associated. Machine data may be considered superimposed on timing setting data and depends on the particular installation and user and may be, for example, data specific to the operation of a particular machine such as the number of sections, number of gobs or other peculiarities of machine operations. Machine data also includes set-up data such as assigning particular actuator valves to specific computer output drivers. The invention thus permits the flexibility to assign different drivers to different valves in the event any driven output becomes defective. Local control panels 67 and 68 are mounted on each individual section 18, one on the blank side of the machine and one on the blow side. Each control panel provides local operator control of various functions as is explained below with reference to FIG. 8.

In one preferred embodiment each local computer 12 was chosen to be a Z-80 microcomputer with a 20K ROM, a 2K non-volatile timing data and media storage and a 1K RAM.

An example of a portable, hand-held local computer terminal 60 is shown in FIG. 3. The basic structure of such a local terminal is a conventional unit available from many sources although the invention includes the unique functions to which the various keys are assigned. The particular local terminal 60 shown in FIG. 3 includes keypad 70 having three groups of keys: the timing group comprising functions keys 71–75; the data entry group comprising the digits and keys 76 and 77; and the menu group comprising keys 78–80. Terminal 60 also includes LED display 81 (two rows, sixteen characters each).

A sample display on local terminal 60 is shown in FIG. 3 to include character groups 82–86. Group 82 represents the number of the event chosen by the operator for display. Group 83 comprises either an "X" or an "O" to indicate whether the "off" timing setting or the "on" timing setting, respectively, will be changed by the entry of data. The operator may alternately select either one of these characters by using key 72. Group 84 represents the name of the event (either in full or abbreviated form). This name appears automatically as a function of the number of the event identified by group 82. Group 85 represents the "on" time in degrees at which the particular event is actuated. Similarly, group 86 represents the "off" time at which that event is deactivated. The "on" and "off" times are automatically displayed to represent the then current values associated with the particular chosen event. Depending upon the character represented in group 83, keys 73 and 74 will either incrementally increase or decrease the "on" or "off" times accordingly. If a totally new timing setting is desired such that incremental changes would be too time consuming, key 75 may be depressed to enable the entry of a new timing value by depressing the selected digits and enter key 77.

The control program for controlling is menu driven and is accessible to the operator by use of the menu group of keys 78–80. Access to the control program is made at predetermined points in the program to enable operator entry of various instructions, machine setting data or timing setting data. The key arrangement on terminal 60 is advantageous because it permits the functionality of the control system to be independent of the hardware. That is, the software control program may be changed while still enabling use of the same hardware. The menu driven software of the control program is traversed using the menu group of keys. Once a particular request drawing instruction is presented on display 81, the "do" key 78 will enable the operator to access the corresponding submenu, if any, by executing the menu item in the display. This procedure continues until the software gets to a terminal node at which the particular menu item displayed will be performed (e.g. timing setting data will be entered). The next and previous keys 79 and 80 enable quick access to menu items. The next key 78 causes the display to cycle through the predetermined menu list in order to prompt the operator to access menu items in a predetermined order to enhance system control.

Terminals 60 or 64 may be used to enter or display timing setting data or machine data in memories 52 and 66, respectively. For example, the various events utilized in sequence to form an article of glassware (as described in U.S. Pat. No. 3,877,915) and their corresponding timing settings may be entered, changed and displayed by activation of the various function keys in keypad 70.

A more detailed diagrammatic view of machine terminal 64 having a keyboard 105 and display 106 is shown in FIG. 4. The keyboard and display of machine terminal 64 provide the same input/output capability as hand-held terminal 60 and further provide additional capabilities to enable the machine operator to input or output data for a selected section from a central location while not interfering with the totally independent operation of each machine section. Keyboard 105 includes a portion 107 functionally similar to keypad 70 of hand-held terminal 60 and a portion 108 unique to machine terminal 64. Portion 108 includes function keys 109 and 110 for selecting "section up" or "section down," respectively in order to enable the operator to choose a section number and increment or decrement that number to get data access to another section. "Event fill" key 111 enables timing data from any selected local computer 12 to be temporarily stored in a temporary data storage (not shown) and to be loaded therefrom into another selected local computer 12, thus facilitating duplication of timing setting data in the several local computers 12 without the necessity of entering data into each one separately. In the prior art systems developed and sold by the assignee of this invention a similar function was performed by transferring data from one portion of a single memory to another portion of the same memory. The fill function may also be accomplished in the embodiment shown in FIG. 1 by the addition of a microcomputer (not shown) between all local computers 12 and multiplexor 63. Keys 112 and 113 may be assigned other desired functions which are not enumerated herein.

Dislay 106 is, in one embodiment, a one line, twenty character display. A representative display is shown in FIG. 4 as being identical to the display shown on the hand-held terminal in FIG. 3 with an additional character group 114 showing the number of the section to which the remaining characters pertain at any one time.

Referring now to FIG. 5 there is shown a more detailed schematic of the multiplexer 62 in the preferred embodiment shown in FIG. 1. Data entered from keyboard 105 provides binary parallel inputs to decoder 102 (actually part of 64). In response to a unique binary input, decoder 102 activates a selected one of its outputs $S_O$ to $S_N$, each of which is connected respectively to the enabling terminal of a bidirectional communications gate 120. Gate 120 may be, for example, an RS422 dual input chip with tristate enable. The input terminals A and B of each gate 120 are connected respectively to the output of RS422 bidirectional gates 122 and 124. The enabling terminals of each of these gates 122 and 124 are connected so as to be continuously activated to enable data transfer between gates 122 and 124 and selected gates 120 whenever the associated enabling signal $S_O$ to $S_N$ is activated. In the preferred embodiment shown, gate 122 provides an interface to machine terminal 64 and gate 124 provides an interface to external archive tape storage unit 65.

In operation, only one output of decoder 102 will be activated at any one time in order to enable data transfer between a particular selected section (represented by the unique input code to the decoder) and the input/output device connected to the data terminals of the gate 120 associated with that section. For example, if the $S_1$ output of decoder 102 is activated local computer 12b for section 1 will have its communication ports 61 and 62 connected to terminal 64 and tape unit 65. This will enable local computer 12b to accept data from keyboard 105 or tape (as may be required by the control program) and will enable data from the selected local computer to be displayed on display 106. If the preprogrammed control program within the selected local computer 12b requires data transfer between it and tape unit 65 then appropriate data transfer will occur.

Figure 6:
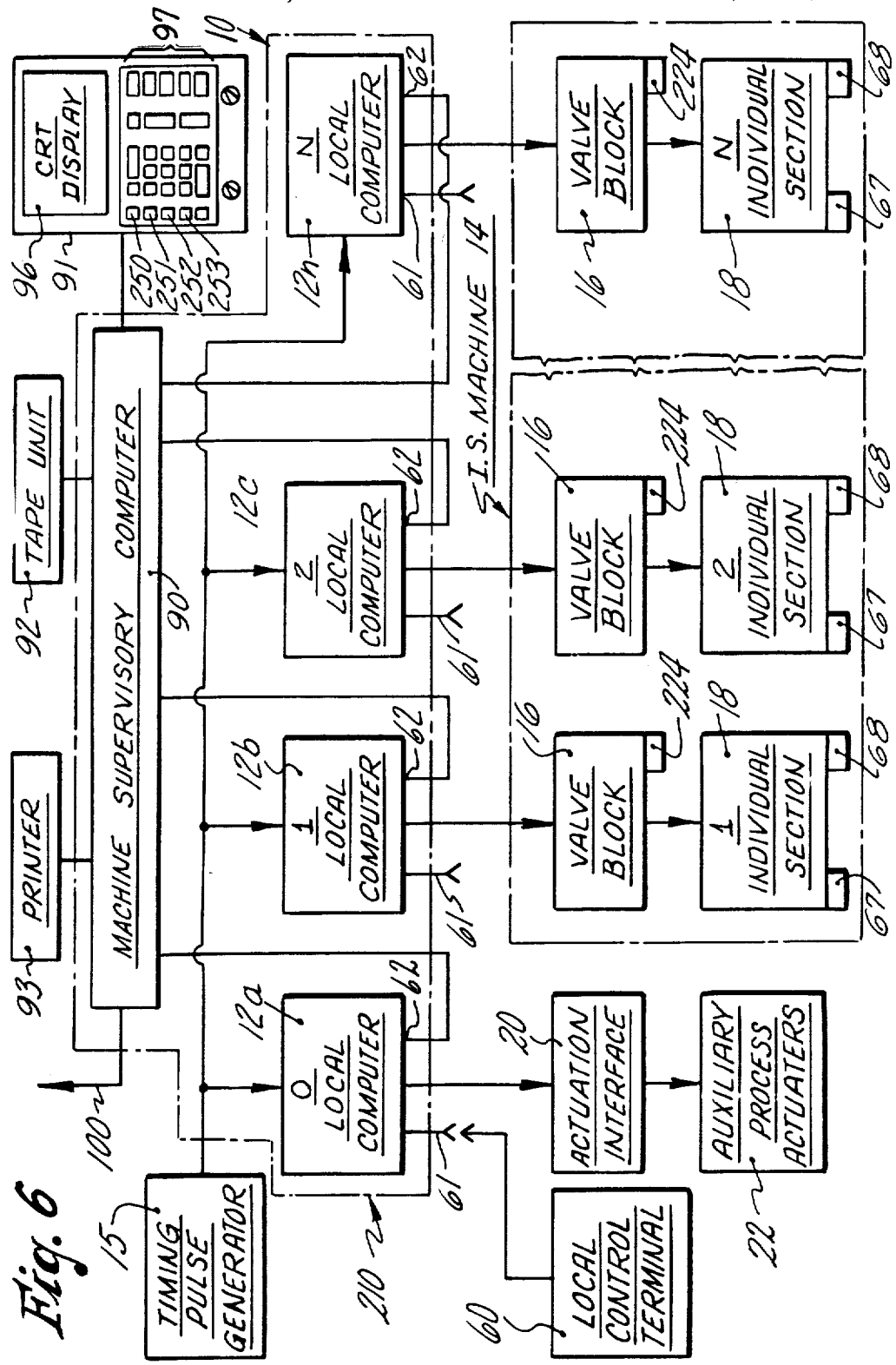
FIG. 6 shows a schematic block diagram of an embodiment of the invention utilizing a global control terminal.

Referring now to FIG. 6 there is shown an embodiment of the invention utilizing a machine supervisory computer 90 connected to communication port 62 of each local computer 12. Computer 90 facilitates operation of the glassware forming machine while still enabling totally independent operation of all individual sections and their respective local computers. Computer 90 includes a bidirectional communications interface (not shown) for interconnecting selected ones of the local computers 12 to selected input/output units connected to computer 90 such as global terminal 91, tape unit 92 and printer 93. Other peripheral I/O units may obviously be used.

Global terminal 91 includes cathode ray tube display 96 and keyboard 97. It will be noted that the global terminal keyboard is similar to the machine terminal keyboard shown in FIG. 4. Indeed, global terminal 91 is similar in function to machine terminal 64, the primary difference being the inclusion of CRT display 96 in the former. Display 96 obviously enables the presentation of more data to the operator so that he may, for example, compare the timing settings of all sections simultaneously.

In the preferred embodiment the local and machine supervisory computers may be housed in forming control enclosure 210. Enclosure 210 may be, for example, an environment-proof enclosure complying with NEMA 12 requirements and may be situated at a convenient distance from the IS machine 14. Each local computer is identical from a hardware point of view and is a modular unit rack mounted within enclosure 210 for easy replacement if necessary. Each valve block 16 is provided with a control panel 224 and each individual section 18 is provided with a blank side control panel 67 and a blow side control panel 68. The blank and blow panels provide local plugs (not shown) by which hand-held terminal 60 may be connected to any selected section, from either the blank or blow side of the machine, and its associated local computer. The panels also provide the machine operator with local access to control functions such as start, emergency stop, ware reject, etc.

Machine supervisory computer 90 provides the means to interface selected ones of local computers 12 to I/O devices such as tape unit 92 or printer 92. Tape unit 92 may be used to store control program data to be loaded into computer 90 to control its operation. Note that the control program stored in tape unit 92 is unit the same as control program data stored in the individual local computers 12. The latter control programs are always stored in ROM within each local computer. The control program stored in tape unit 92 is used only to control the operation of computer 90 and does not inhibit in any way the independent operation of each local computer and its corresponding section.

It will be noted that machine supervisory computer 90 may provide access to all timing setting data within system 10. Hard copy printouts of any selected data may be obtained through printer 93. Computer 90 may also be provided with an output data channel 100 for providing selected data to external data processing equipment (not shown). Global terminal 91, tape storage unit 92, printer 93 or other peripheral units (not shown) may be connected to computer 90 and situated in a convenient location either adjacent machine 14 or in a remote control room.

In one embodiment machine supervisory computer 90 may be, for example, an LSI-11 minicomputer available from Digital Equipment Corporation. The particular LSI-11 used in this embodiment has a 256K RAM for temporary data storage to facilitate data transfer between selected local computers and peripheral units connected to computer 90. By reference to FIGS. 2 and 6 it will be noted that data communications between computer 90 and selected local computer 12 may occur through port 62 and associated communication interface 58. It is thus apparent that communications may occur directly between CPU 54 of the selected local computer and the central processing unit included in the LSI-11. As shown in FIG. 6 hand-held terminal 60 may be connected to port 61 of a chosen local computer to provide parallel communications if desired. In any event, since each local computer 12 is provided with its own unalterable program storage means 50 as well as non-volatile timing and machine data storage means 62 and 66, respectively, each local computer 12 may operate independently of any other and independently of computer 90. Contrary to prior art control systems for glassware forming machines, no loading of control program data into local computers 12 is necessary to permit their operation.

Terminal 91 may include coded access key slots 250–253. Each key slot will accept only a predetermined key or code. The control program for computer 90 is written so that control and display of various data is limited to authorized personnel according to a chosen hierarchy in the glass plant. A four level access hierarchy arranging from lowest to highest may be, for example, operator, set-up crew, product management and equipment maintenance.

Operation of system 10 and access to various timing and control data within the system is a function of the particular key slot which may be activated. For example, a machine operator may operate the machine and all of its sections by inserting the proper key into slot 250 corresponding to the lowest access level (level 1). The operator may thus control display and entry of only the timing and control data necessary to perform his work and may make certain limited changes to timing setting data and the like. The operator would be prevented from accessing or making changes to other data. A set-up crew may be given a key for slot 251 and thus permitted display and entry access to all of the data available to the operator plus some additional selected data such as machine data necessary to set-up the system for operation onn a particular machine (i.e. access level 2). Additional data access is similarly available by providing keys to slots 252 (level 3) and 254 (level 4) to those individuals needing access to such levels. Such a system prevents, for example, an operator from changing data beyond the scope necessary to perform his work or from obtaining access to sensitive production data.

Referring now to FIG. 7 the operator controls available on each valve block 224, overhead or blank side panel 67 and blow side panel 68 are shown in more detail. Each section is provided with the same operator controls for performing the functions of basic section control, adjustment cycle selection and operator aids.

The basic section controls available to the operator are section start (available only on panel 67), normal stop to a preprogrammed position (available on panels 224 and 68), alternate stop to another preprogrammed position (available on panel 67), delivery start and stop (available on panels 224 and 68 respectively) and maintenance or emergency stop (available on panels 224 and 228).

There are adjustment cycles also available to enable the operator to cause the control system to perform a predetermined sequence of steps in order to accomplish certain features. For example, blow side panel 68 is provided with a "neckring change" control in order to position the section for easy alignment and changing of neckrings, "blowhead adjust" control for adjusting the blowhead. Blank side panel 67 is provided with a "finish measurement" control for determining the height of the bottle's finish above the mold.

Various operator aid controls are also available in order to assist the operator in performing various duties which heretofore had to be manually performed. For example, blank side panel 67 is provided with a swab control to initiate a swab cycle to automatically position the particular section's blank side for efficient swabbing. Similarly, panels 67 and 68 are provided with "cold blank" and "cold mold" controls for altering the sections cycle for efficient heating of blank and blow molds respectively during start up or after mold change. Ware reject controls are provided to assist the operator in automatically rejecting selected glassware. These controls are available from either the blank side or the blow side in order for the operator to be able to reject ware produced by either side. Four reject buttons are provided on each panel 67 and 68, one each for each mold within each section. (Note that the panels shown here are designed for a "quad-gob" system having four molds in each section of the machine.) Blank side panel 67 is provided with ware reject buttons enabling the rejection of bottles currently produced in the respective blank side molds such as, for example, during start up of the section. Blow side panel 68 is provided with ware reject buttons capable of either continuous rejection of bottles produced by selected blow molds or rejection of a predetermined number of bottles such as, for example, after swabbing. The control system may also be programmed to automatically select the ware reject function after activation of either "cold blanks", "cold molds", or "swab" controls.

It will understood by those skilled in the art that numerous modifications and improvements may be made on the preferred embodiments of the invention disclosed herein without departing from the spirit and scope thereof.

What is claimed is:

1. In a glassware forming machine of the "individual section" type including a plurality of sections operable in phased relationship within a cycle of operation of the machine, each of said sections having a complete set of functional components for receiving gobs of molten glass and forming glassware articles in response to control signals which actuate and deactuate said functional components, said glassware forming machine providing a machine synchronizing signal at a predetermined point of each cycle of operation,
   a control system for enabling the simultaneous and independent operation of said plurality of sections, comprising:
   a plurality of local computer means, each respectively associated with one of said sections, for producing the component actuating and deactuating signals in coordination with the machine synchronizing signal, and for identifying said component actuating and deactuating signals with said functional components, each of said local computer means comprising:
      unalterable program storage means for storing a section control program to control the operation of said local computer means without regular ongoing communication with any supervisory controller;
      non-volatile memory means for storing selected timing data indicative of actuation an deactuation times of said functional components within each cycle of operation, and for storing machine data which together with said timing data specify the parameters of said control program; and
      controller means for receiving said machine synchronizing signal and said timing data and machine data and for processing these in accordance with said control program to produce said component actuating and deactuating signals;
   a plurality of interface means, each interposed respectively between one of said local computer means and its associated section for actuating and deactuating the functional components of said section in response to said component actuating and deactuating signals;
   local terminal means for user display, entry, and modification of selected timing and machine data, wherein said local terminal means is capable of handling all parameters of said section control program; and
   bidirectional communication means for connecting said local terminal means to a selected one of said local computer means.

2. A glassware forming machine in accordance with claim 1 wherein said terminal means further comprises:
   display means for presenting to an operator pursuant to said predetermined control program at least one of a plurality of predetermined programmed requests for instruction or data input for prompting said operator to input an appropriate instruction or data at a predetermined point in said predetermined control program;
   keyboard means for entering into said local computer means instructions or data in response to said requests.

3. A glassware forming machine in accordance with claim 2 wherein said keyboard means comprises:
   a group of various data keys for entering numerical data;
   a group of various timing keys for entering predetermined changes to the timing data displayed on said display means;
   a group of various menu keys for enabling the operator to access selected portions of said control program.

4. A control system in accordance with claim 1 further comprising means for transferring selected timing setting data from one of said local computer means to another of said local computer means.

5. A control system for controlling the actuation and deactuation timing of a plurality of functional components of individual sections of a glassware forming machine, said glassware forming machine including a plurality of said sections each independently operable in phased relationship within a cycle of operation of said machine to receive gobs of molten glass and form one or more glassware article per section, said glassware forming machine providing a machine synchronizing signal at a predetermined point within said cycle of operation, said system comprising:
   (a) a plurality of local computers, each respectively associated with one of said sections, for generating component actuating and deactuating signals and for identifying said signals with said functional components, each of said local computers comprising
      unalterable program storage means for storing a section control program to control the operation of said local computer means;
      non-volatile memory means for storing selected timing data indicative of actuation and deactuation times of said functional components within each cycle of operation, and for storing machine data which together with said timing data specify the parameters of said control program; and
      controller means for receiving said machine synchronizing signal and said timing data and machine data and for processing these in accordance with said control program to produce component actuating and deactuating signals;
   (b) global terminal means for permitting user display, entry, and modification and data within the non-volatile memory means of a selected local computer;
   (c) machine supervisory computer means for connecting said global terminal means to a user-selected one of said local computers via a bidirectional communications link, wherein the section control program does not provide regular ongoing communications with said machine supervisory computer means;
   (d) local terminal means for user display, entry, and modification of selected timing and machine data, wherein said local terminal means is capable handling all parameters of said section control program; and
   (e) a plurality of interface means each interposed respectively between one of said local computer means and its associated section for actuating and deactuating the functional components of said section in response to said component actuating and deactuating signals.

6. A control system in accordance with claim 5 further comprising:
    first storage means for storing first predetermined control data for controlling the operation of said machine supervisory computer;
    means for loading said first predetermined control data into said machine supervisory computer.

7. A control system in accordance with claim 5 further comprising:
    access code means for enabling access to selected data only upon entry of a predetermined identifying code, each identifying code being associated with predetermined portions of said selected data.

8. A control system in accordance with claim 7 wherein said access code means includes progressively increasingly restrictive levels of access to said selected data.

9. A control system in accordance with claim 5, further comprising local terminal means capable of displaying, entering, and altering selected data within the nonvolatile memory means of a given local computer.

10. A control system in accordance with claim 9 wherein said local terminal means further comprises:
    display means for presenting to an operator pursuant to said predetermined control program at least one of a plurality of predetermined programmed requests for instruction or data input for prompting said operator to input an appropriate instruction or data at a predetermined point in said predetermined control program; and
    keyboard means for entering into said local computer means instructions or data in response to said requests.

11. A control system in accordance with claim 10 wherein said keyboard means comprises:
    a group of various data keys for entering numerical data;
    a group of various timing keys for entering predetermined changes to the timing data displayed on said display means; and
    a group of various menu keys for enabling the operator access selected portions of said control program.

12. In a glassware forming machine of the "individual section" type including a plurality of sections operable in phased relationship within a cycle of operation of the machine, each of said sections having a complete set of functional components for receiving gobs of molten glass and forming glassware articles in response to control signals which actuate and deactuate said functional components, said glassware forming machine providing a machine synchronizing signal at a predetermined point of each cycle of operation,
    a control system for enabling the simultaneous and independent operation of said plurality of sections, comprising:
    a plurality of local computer means, each respectively associated with one of said sections, for producing the component actuating and deactuating signal in coordination with the machine synchronizing signal, and for identifying said component actuating and deactuating signals with said functional components, each of said local computer means comprising
        unalterable program storage means for storing a section control program to control the operation of said local computer means without regular ongoing communications with any supervisory controller;
        non-volatile memory means for storing selected timing data indicative of actuation and deactuation times of said functional components within each cycle of operation, and for storing machine data which together with said timing data specify the parameters of said control program; and
        controller means for receiving said machine synchronizing signal and said timing data and machine data and for processing these in accordance with said control program to produce said component actuating and deactuating signals;
    a plurality of interface means, each interposed respectively between one of said local computer means and its associated section for actuating and deactuating the functional components of said section in response to said component actuating and deactuating signals;
    local terminal means for displaying predetermined portions of said control program, and for user display entry, and modification of selected timing and machine data, said local terminal means being capable of handling all parameters of said control program;
    bidirectional communications means for connecting said local terminal means to a selected for one of aid local computer means;
    and further comprising means for controlling the actuation and deactuation of a plurality of components associated with machine functions common to all said sections, comprising a machine computer, machine terminal means, and machine interface means respectively analogous to one of said local computers, local terminals, and local interface means.

13. A control system in accordance with claim 12 wherein the hardware component of said machine computer means is identical to the hardware component of at least one of said local computer means.

14. A control system in accordance with claim 12 wherein said second non-volatile storage means for storing said second predetermined control program is an unalterable storage means.

15. A control system in accordance with claim 12 wherein said local terminal means further comprises:
    display means for presenting to an operator pursuant to said predetermined control program at least one of a plurality of predetermined programmed requests for instruction or data input for prompting said operator to input an appropriate instruction or data at a predetermined point in said predetermined control program; and
    keyboard means for entering into said local computer means instructions or data in response to said requests.

16. A control system in accordance with claim 15 wherein said keyboard means comprises:
    a group of various data keys for entering numerical data;
    a group of various timing keys for entering predetermined changes to the timing data displayed on said display means; and a group of various menu keys for enabling the operator to access selected portions of said control program.

17. A control system in accordance with claim 12 further comprising means for transferring selected timing setting data from one of said local computer means to another of said local computer means.

* * * * *